July 28, 1925.
H. C. MALLORY
EXPANSIBLE COLLAPSIBLE ELEMENT
Filed Aug. 31, 1920
1,547,431
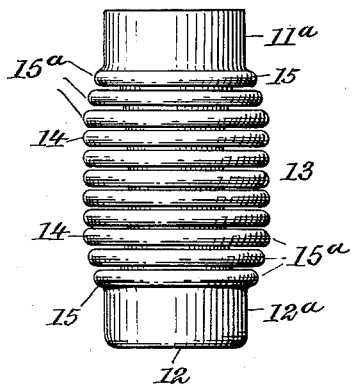
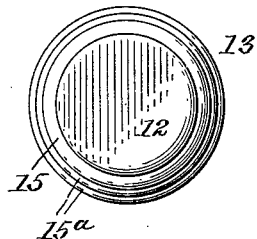
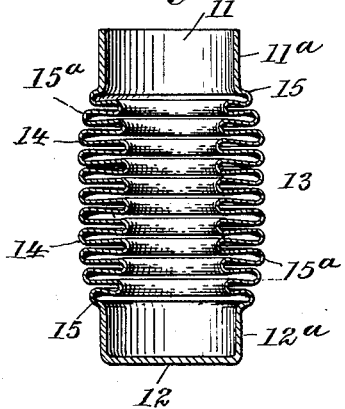

Patented July 28, 1925.

1,547,431

UNITED STATES PATENT OFFICE.

HARRY C. MALLORY, OF BELLPORT, NEW YORK, ASSIGNOR, BY MESNE ASSIGNMENTS, TO AMERICAN RADIATOR COMPANY, OF CHICAGO, ILLINOIS, A CORPORATION OF NEW JERSEY.

EXPANSIBLE-COLLAPSIBLE ELEMENT.

Application filed August 31, 1920. Serial No. 407,210.

*To all whom it may concern:*

Be it known that I, HARRY C. MALLORY, a citizen of the United States, residing at Bellport, Suffolk County, in the State of New York, have invented certain new and useful Improvements in Expansible-Collapsible Elements, of which the following is the full, clear, and exact specification.

My invention relates to improvements in expansible-collapsible elements adapted for use in connection with thermosensitive or pressure sensitive devices, and for other purposes, and the same has for its object to provide an element having an extremely sensitive body portion, and less sensitive or flexible end portions extending therefrom.

Further, said invention has for its object to provide an expansible-collapsible element having a flexible or elastic body portion, a substantially inelastic or rigid portion or portions extending therefrom, and intermediate portions possessing less elasticity or flexibility connecting said elastic or flexible body portion with said inelastic or rigid end portion or portions.

Further, said invention has for its object to provide an expansible-collapsible element having a flexible or elastic body portion, a substantially inelastic or rigid heavier end portion extending from one or both of the ends of said body portion, and annular portions whose walls taper from said heavier end portions towards said body portion and provided with corrugations which become progressively shallower as the same approach said heavier end portions with which the same merge.

Other objects will in part be obvious, and in part be pointed out hereinafter.

To the attainment of the aforesaid objects and views my invention consists in the novel details of construction, and in the combination, connection and arrangement of parts hereinafter more fully described, and then pointed out in the claims.

In the accompanying drawings forming part of this specification wherein like numerals of reference indicate like parts, Figure 1 is a side elevation showing one form of expansible-collapsible element constructed according to, and embodying my said invention;

Fig. 2 is a bottom view thereof, and

Fig. 3 is a central vertical section.

In said drawings 10 designates a cylindrical shell having an open end portion 11, a closed end portion 12, and an intermediate or body portion 13. The shell 10 is provided adjacent to its ends 11 and 12 with flat substantially inelastic, annular portions 11$^a$, 12$^a$, respectively, the walls of which are made considerably thicker than the wall of the intermediate or body portion 13. As shown in the drawings the closed end 12 is of the same thickness as the annular portion 12$^a$ from which it is formed.

The wall of the body portion 13 is made uniformly thinner than the end portions 11, 12, and is provided with a series of parallel circumferential corrugations 14. Between the ends of the corrugated body portion 13 and the end portions 11, 12, are formed annular, tapering portions 15, which become thinner as the same approach the opposite end portions of the corrugated body portion 13 with which the same merge.

The tapering, annular portions 15 are provided with circumferential corrugations 15$^a$, which become progressively shallower as the metal of the shell wall in which they are formed becomes heavier. That is to say, the corrugations are deeper and most elastic at the central part of the intermediate or body portion and become shallower as they recede from said corrugated intermediate or body portion 13 whereby the flexing moment of the elastic body portion of the shell is distributed over a greater area to obviate the liability of the flexible body part of the shell becoming fractured where the same unites with the substantially inelastic or rigid end portions 11, 12.

It will of course be understood that the shell 10 may be made with both end portions open, although it is herein shown as having an open end and a closed end. The closed end 12 and the annular portion 12$^a$ extending therefrom as well as the annular portion 11$^a$ at the open end may be made heavier or of greater thickness than the corrugated intermediate or body portion. One of said ends may also be heavy or thick and the other end thinner, or both of said ends may be formed thinner than said body portion.

Having thus described my said invention what I claim and desire to secure by Letters Patent is:—

1. An expansible-collapsible element comprising a shell having substantially inelastic end portions, and an elastic portion intermediate said inelastic end portions; said elastic portion being most resilient at its central portion and becoming less resilient as it approaches said inelastic end portions with which it merges, substantially as specified.

2. An expansible-collapsible element comprising a shell having substantially inelastic end portions and an elastic portion intermediate said inelastic end portions composed of circumferential corrugations; said corrugations being most resilient at the central portion of the same and becoming progressively less resilient as the same approach said inelastic end portions with which they merge, substantially as specified.

3. An expansible-collapsible element comprising a shell having a circumferentially corrugated elastic body portion, an inelastic end portion, and a corrugated elastic portion connecting said end portion to said body portion; the last named corrugations successively diminishing in depth from said body portion towards said end portion, substantially as specified.

4. An expansible-collapsible element comprising a shell having a substantially inelastic end portion, and a corrugated elastic portion merging with said inelastic end portion; the corrugations successively diminishing in depth as the same approach said end portion to render said elastic portion progressively less resilient towards said end portion, substantially as specified.

5. An expansible-collapsible element comprising a cylindrical shell having a circumferentially corrugated elastic body portion and an inelastic end portion connected thereto by an annular portion having corrugations successively diminishing in depth from said body portion towards said end portion, substantially as specified.

6. An expansible-collapsible element comprising a cylindrical shell having a circumferentially corrugated elastic body portion and an inelastic end portion connected thereto by an annular tapering portion having corrugations successively diminishing in depth from said body portion towards said end portion, substantially as specified.

7. An expansible-collapsible element comprising a shell having an end wall portion, and a corrugated wall portion merging therewith and increasing in thickness towards said end wall portion; the corrugations successively diminishing in depth towards said end wall portion, substantially as specified.

8. An expansible-collapsible element comprising a shell having a circumferentially corrugated body portion, and an end portion extending therefrom; the wall of said end portion being of greater thickness than the wall of said body portion and united therewith by an annular wall portion of gradually diminishing thickness and having corrugations therein becoming progressively deeper as the same approach said corrugated body portion, substantially as specified.

9. An expansible-collapsible element comprising a shell having a body portion provided with circumferential corrugations of uniform depth, and end wall portions of greater thickness than the wall of said body portion extending from said corrugated body portion and united therewith by annular tapering portions; each of said annular tapering portions having corrugations becoming progressively shallower as the same approach the end portion into which the same merge, substantially as specified.

10. An expansible-collapsible element comprising a shell having a cylindrical body portion provided with circumferential corrugations of uniform depth, and end wall portions of greater thickness than the wall of said body portion extending from said corrugated body portion and united therewith by annular tapering portions; each of said annular tapering portions having corrugations becoming progressively shallower as the same approach the end portion into which the same merge, substantially as specified.

Signed at the city of New York, New York County, in the State of New York, this first day of June, one thousand nine hundred and twenty.

HARRY C. MALLORY.

Witnesses:
 CONRAD A. DIETERICH,
 IRENE V. BANNIN.